(12) United States Patent
Caccami et al.

(10) Patent No.: US 11,897,217 B2
(45) Date of Patent: Feb. 13, 2024

(54) METHOD TO MANUFACTURE AN ELECTRONIC DEVICE FOR A RUBBER ARTICLE

(71) Applicant: BRIDGESTONE EUROPE NV/SA [BE/BE], Zaventem (BE)

(72) Inventors: Maria Cristina Caccami, Rome (IT); Francesco Iozia, Rome (IT); Raffaele Di Ronza, Rome (IT); Roberto Lombardi, Rome (IT); Maria Cecilia Palumbi, I, Rome (IT); Giacomo Andreini, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 61 days.

(21) Appl. No.: 17/626,651

(22) PCT Filed: Jul. 15, 2020

(86) PCT No.: PCT/IB2020/056656
§ 371 (c)(1),
(2) Date: Jan. 12, 2022

(87) PCT Pub. No.: WO2021/014278
PCT Pub. Date: Jan. 28, 2021

(65) Prior Publication Data
US 2022/0281196 A1 Sep. 8, 2022

(30) Foreign Application Priority Data
Jul. 23, 2019 (IT) .................. 102019000012636

(51) Int. Cl.
*B29D 30/00* (2006.01)
*B60C 23/04* (2006.01)
(Continued)

(52) U.S. Cl.
CPC ...... *B29D 30/0061* (2013.01); *B60C 23/0447* (2013.01); *B60C 23/0493* (2013.01);
(Continued)

(58) Field of Classification Search
CPC ............ B29D 30/0061; B60C 23/0447; B60C 23/0493; G06K 19/07764; G06K 19/07773
(Continued)

(56) References Cited

U.S. PATENT DOCUMENTS 11,021,021 B1 * 6/2021 Nicula ................. B60C 19/00
11,339,276 B2 * 5/2022 Nomaguchi ............ C08K 5/44
(Continued)

FOREIGN PATENT DOCUMENTS

DE 102017209552 A1 12/2018
JP 2014024544 A 2/2014
(Continued)

OTHER PUBLICATIONS

International Searching Authority: European Patent Office for corresponding International Patent Application No. PCT/IB2020/056656 dated Dec. 23, 2020, 4 pages.
(Continued)

*Primary Examiner* — Allyson N Trail
(74) *Attorney, Agent, or Firm* — Patterson Intellectual Property Law, P.C.

(57) ABSTRACT

A method to manufacture an electronic device to be applied to rubber article. The device comprises an electronic element, two layers of thermoplastic material which are arranged in a sandwich-like manner so as to contain, between one another, the electronic element, and at least an outer rubber layer arranged to cover an outer surface of at least one of the respective thermoplastic layers. The method comprises a preliminary step comprising (a) a deposition operation, during which an adhesive solution consisting of a basic water solution comprising a latex of an elastomer rubber and a combination of resorcinol and formaldehyde is applied on at least one outer surface of one of the layers of thermoplastic material; and (b) a heating operation, during which the layers of thermoplastic material on which the adhesive solution was applied are kept at a temperature ranging from 120 to 230° C. for an amount of time ranging from 2 to 15 min.

20 Claims, 1 Drawing Sheet

(51) Int. Cl.
  *G06K 19/077* (2006.01)
  *H01Q 1/22* (2006.01)
(52) U.S. Cl.
  CPC . *G06K 19/07764* (2013.01); *G06K 19/07773* (2013.01); *B29D 2030/0083* (2013.01); *H01Q 1/2241* (2013.01)
(58) Field of Classification Search
  USPC ........................................................ 235/492
  See application file for complete search history.

(56) References Cited

U.S. PATENT DOCUMENTS

| | | | |
|---|---|---|---|
| 2014/0027030 A1 | 1/2014 | Frantzen et al. | |
| 2018/0057667 A1* | 3/2018 | Tsuji | C08K 5/405 |
| 2018/0154693 A1* | 6/2018 | Homma | B60C 5/01 |
| 2019/0100643 A1* | 4/2019 | Hatano | B60C 1/00 |
| 2020/0247931 A1* | 8/2020 | Kodemura | C08K 5/38 |
| 2020/0340237 A1* | 10/2020 | Jordan | B32B 27/302 |
| 2021/0154975 A1* | 5/2021 | Yim | D02G 3/48 |
| 2021/0207295 A1* | 7/2021 | Lee | B60C 9/005 |
| 2021/0271951 A1* | 9/2021 | Moon | G06K 19/07764 |
| 2021/0312253 A1* | 10/2021 | Cassidy | B32B 25/08 |
| 2021/0354411 A1* | 11/2021 | Uijlenbroek | B29D 30/0606 |
| 2022/0251347 A1* | 8/2022 | Komori | C08L 9/06 |
| 2022/0281196 A1* | 9/2022 | Caccami | G06K 19/07764 |
| 2022/0362976 A1* | 11/2022 | Schroiff | C08K 13/04 |

FOREIGN PATENT DOCUMENTS

| | | |
|---|---|---|
| JP | 2017132291 A | 8/2017 |
| KR | 20160050452 A | 5/2016 |
| WO | 2016053933 A1 | 4/2016 |
| WO | 20190130197 A1 | 7/2019 |

OTHER PUBLICATIONS

Office Action for corresponding Japanese patent application No. 2022-504294, dispatched on Jan. 31, 2023, 5 pages.

* cited by examiner

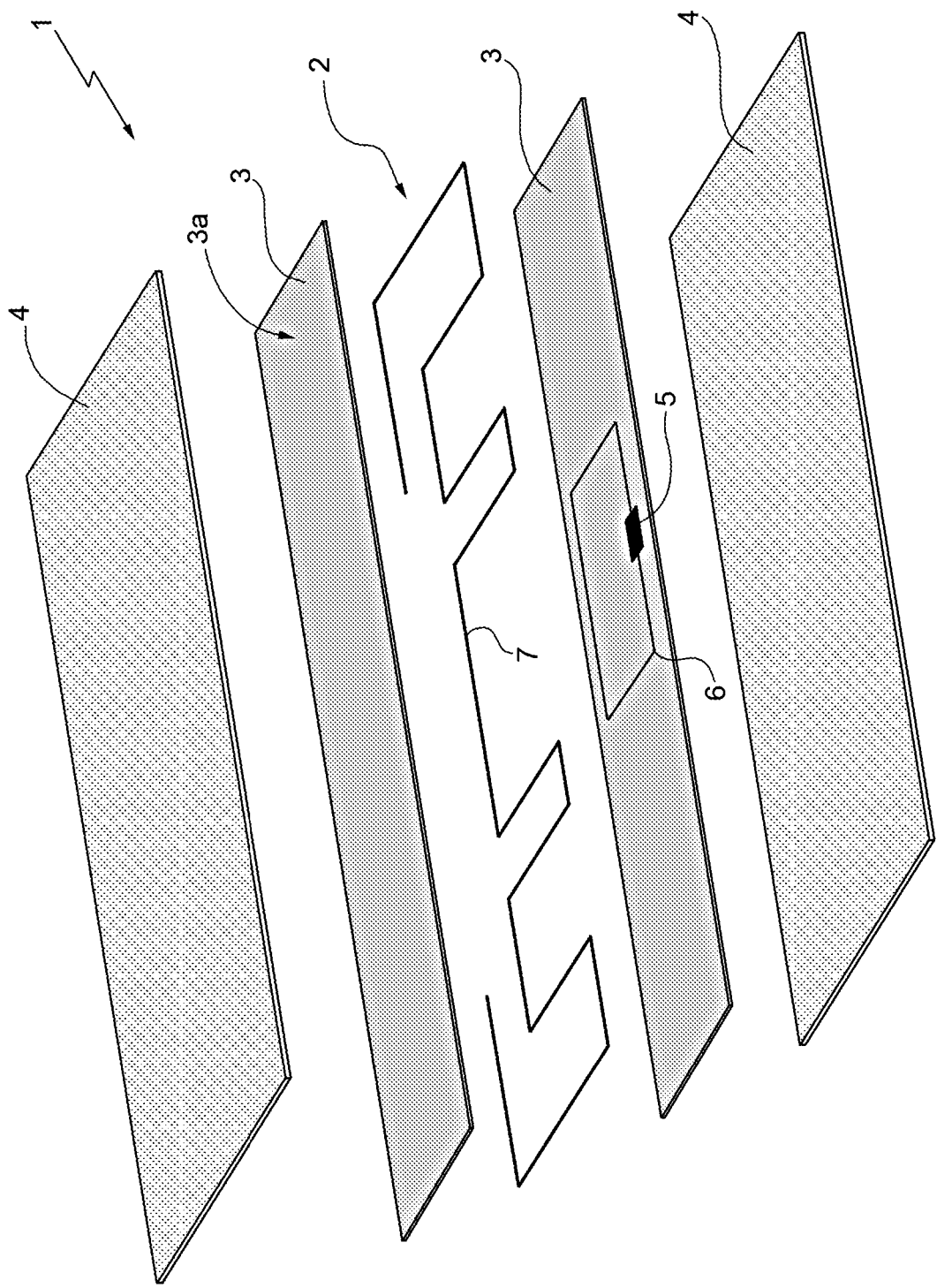

METHOD TO MANUFACTURE AN ELECTRONIC DEVICE FOR A RUBBER ARTICLE

The invention relates to a method to manufacture an electronic device to be used in rubber articles.

In particular, the invention refers to a patch radio-frequency identification (RFID) device for tire applications, to which the description will explicitly refer without loss of generality.

In the tire industry, manufacturers have expressed the need for solutions that allow for an automated and unequivocal identification of tires during their production, their use and their disposal.

For example, with specific reference to the production of tires, the automated and unequivocal identification of the tires can allow manufacturers to optimize production processes and logistics operations, support the use of automated control systems, carry out an efficient localization/tracking of the tires and, hence, build smart tire factories.

The solution involving the use of barcodes applied on the tires, despite allowing manufacturers to handle the production of tires and the production history of the single tires, is however affected by a series of drawbacks concerning the recording of a limited number of items of information, the reading of the codes one by one with a given line of sight and the risk of the codes being cancelled or damaged during the production and/or the normal operation/use of the tires, thus becoming unreadable or, anyway, difficult to read.

An alternative to the use of barcodes involves a patch radio-frequency identification (RFID) device for tires. This device consists of a multi-layer planar, flexible structure, which substantially comprises two insulating layers made of PET, which are arranged in a sandwich-like manner so as to contain, between one another, an RFID chip, a first antenna connected to the chip and, at least partially, a second antenna electromagnetically coupled to the first antenna, and two outer rubber layers, each arranged so as to cover an outer surface of a respective insulating layer.

For insulating material like PET we mean "a lossless material with low relative permittivity and low electrical conductivity".

Experiments have shown that this solution has a critical point concerning the adhesion between the insulating layers and the respective rubber layer with which they are in contact.

As a person skilled in the art can immediately understand, if the insulating PET layers, which enclose the antennas and the chip, are not correctly adhered to the two outer rubber layers, the RFID and the surrounding rubber of the tire layers can be damaged. In particular, there can be a splitting up of the device, that necessarily jeopardizes the correct operation of the device and can cause possible damages to the rubber layer where the device is housed.

Indeed, if the insulating layers come out of the device due to the failed adhesion with the outer rubber layers, they can make cuts and cracks in the surrounding rubber of the tire.

Basically, the same technical problem can be met in many other electronic devices to be inserted in a tire, of which the RFID is just an example. Other electronic devices could be generic sensors used in tire applications like temperature sensors, pressure sensors or even energy harvesters.

Therefore, there is the need to have a solution that ensures a correct structural stability of the electronic device to be applied in a tire.

The inventors of this invention conceived a method capable of fulfilling the aforesaid need.

The subject-matter of the invention is a method to manufacture an electronic device to be applied to rubber article; said device comprising an electronic element, two layers of thermoplastic material which are arranged in a sandwich-like manner so as to contain, between one another, said electronic element, and at least an outer rubber layer arranged to cover an outer surface of at least one of the thermoplastic layers; said method being characterized by comprising a preliminary step comprising (a) a deposition operation, during which an adhesive solution consisting of a basic water solution comprising a latex of an elastomer rubber and a combination of resorcinol and formaldehyde is applied on at least one outer surface of one of the layers of thermoplastic material; and (b) a heating operation, during which the layers of thermoplastic material on which the adhesive solution was applied are kept at a temperature ranging from 120 to 230° C. for an amount of time ranging from 2 to 15 min.

Preferably, at least one of the layers of thermoplastic material is made of insulating material.

Preferably, said insulating material is chosen in the in the group comprising polyesters, polyamides, polyimides.

Preferably, said insulating material is comprised in the group consisting of PET, Nylon and polyethylene naphtalate.

Preferably, said rubber article is a tire.

Preferably, said electronic element comprises an RFID chip, a first antenna connected to the chip and a second antenna electromagnetically coupled to the first antenna.

Said basic water solution preferably comprises a pre-condensed resin consisting of resorcinol and formaldehyde with isocyanate blocking groups.

Said basic water solution preferably comprises lignin and a chemical chosen between urea and thiourea.

Said elastomer rubber latex preferably comprises a latex of stirene-butadiene-vinylpyridine or a latex of a mixture of stirene-butadiene-vinylpyridine and stirene-butadiene.

Said deposition operation preferably involves said adhesive solution being applied on both surfaces of the layers of thermoplastic material.

A further subject-matter of the invention is an electronic device to be used in rubber article characterized by being realized by the method according to method of the present invention.

The invention will be best understood upon perusal of the following description of an explanatory and non-limiting embodiment, with reference to the accompanying FIGURE, which shows the radio-frequency identification device in an exploded view.

In the FIGURE, number 1 indicates, as a whole, a radio-frequency identification (RFID) device according to the invention.

The device 1 comprises a transceiver assembly 2, two PET layers 3 arranged in a sandwich-like manner on opposite sides of the transceiver assembly 2 and two outer rubber layers 4, each arranged on a respective outer surface 3a of a PET layer 3. The transceiver assembly 2 comprises an RFID chip 5, a first antenna 6 connected to the RFID chip 5 and a second antenna 7 electromagnetically coupled to the first antenna 6.

Two radio-frequency identification (RFID) devices of the type shown in the FIGURE were manufactured. The two devices are different from one another only because one of them was manufactured by depositing an adhesive solution according to the invention on an outer surface 3a of each PET layer 3.

The adhesive solution was applied on the surface 3a by means of a brush (deposition operation).

Table I shows the composition, in parts by weight, of the adhesive solution used.

TABLE I

| Latex stirene-butadiene-vinylpyridine | 72.7 |
|---|---|
| Resorcinol | 5.0 |
| Formaldehyde | 2.3 |
| Methylene diphenyl diisocyanate | 20.0 |

After having applied the adhesive solution (deposition operation), the two PET layers 3 were subjected to a heating operation. The heating operation involved keeping the two PET layers 3 on which the adhesive solution was applied in an oven at 220° C. for an amount of time of 3 minutes.

Unlike what described above, according to a further embodiment of the invention, the adhesive solution comprises a pre-condensed resin consisting of resorcinol and formaldehyde with isocyanate blocking groups, lignin and a chemical chosen between urea and thiourea. This adhesive solution offers the advantage of not having to use formaldehyde in a free form.

After having carried out the preliminary step described above, the process goes on with a first step, in which the transceiver assembly 2 is housed between the two PET layers 3, and, subsequently, with a second step, in which the two PET layers 3 are covered on the outside with two respective layers 4 of non-vulcanized rubber.

Alternatively, the two PET layers 3 can be covered on the outside with two respective layers 4 of partially or totally vulcanized rubber.

By so doing, a first RFID device was manufactured.

The second RFID device was manufactured repeating the method described above with the sole exception of not having carried out the preliminary step. In other words, in the manufacturing process of the second RFID device, the first step was carried out using the PET layers 3 without having applied the adhesive solution on them.

Unlike what described above, according to a preferred embodiment of the invention, the adhesive solution can be applied on both surfaces of the PET layers 3.

In use, the RFID devices described above are included in a green rubber portion of a tire.

Alternatively, the RFID devices described above can be applied on a cured rubber portion of a tire.

Once the RFID device has been inserted inside the tire, the vulcanization step is carried out. By so doing, the rubber layers of the RFID device, during the vulcanization, are cross-linked with the surrounding rubber, ensuring the stability of the position of the device.

The first and the second RFID devices were subjected to an adhesion test according to ASTM D1876 method. Said test measures the adhesion force between each one of the PET layers 3 and the respective rubber layer 4 arranged so as to cover the outer surface 3a.

Table II shows the values obtained with the aforesaid test.

TABLE II

| | First RFID device | Second RFID device |
|---|---|---|
| Adhesion force (N/mm) | 6.73 | 0.37 |

The values shown in Table II clearly prove that the method of the invention can ensure a strong adhesion between the PET layer 3 and the respective rubber layer 4, thus avoiding a splitting up of the device and the problems caused by it.

Two other radio-frequency identification (RFID) devices (the third and the fourth RFID devices) of the type shown in the FIGURE were manufactured. The third and the fourth RFID devices differ from the first and the second RFID devices because they comprise layer 3 made of Nylon and not PET.

In addition, the third and the fourth RFID devices differ from each other in the conditions used in the heating operation (b).

In particular,
for the third RFID device, the adhesive solution of table I was applied on the surface 3a of the Nylon layer by means of a brush (deposition operation).

After having applied the adhesive solution (deposition operation), the two Nylon layers 3 were subjected to a heating operation. The heating operation involved keeping the two Nylon layers 3 on which the adhesive solution was applied in an oven at 220° C. for an amount of time of 5 minutes.

for the fourth RFID device, the adhesive solution of table I was applied on the surface 3a of the Nylon layer by means of a brush (deposition operation).

After having applied the adhesive solution (deposition operation), the two Nylon layers 3 were subjected to a heating operation. The heating operation involved keeping the two Nylon layers 3 on which the adhesive solution was applied in an oven at 155° C. for an amount of time of 10 minutes.

For the first, third and fourth RFID devices the same amount of adhesive solution was applied on the respective surfaces 3a.

The third and the fourth RFID devices were subjected to an adhesion test according to ASTM D1876 method for measuring the adhesion force between each one of the Nylon layers 3 and the respective rubber layer 4 arranged so as to cover the outer surface 3a.

Table III shows the values obtained with the aforesaid test.

TABLE III

| | Third RFID device | Fourth RFID device |
|---|---|---|
| Adhesion force (N/mm) | 6.9 | 7.9 |

Also the values shown in Table III clearly prove that the method of the invention can ensure a strong adhesion between the Nylon layer 3 and the respective rubber layer 4, thus avoiding a splitting up of the device and the problems caused by it.

As stated above, the present invention adapts to any electronic device to be applied to a rubber article, e.g. a tire.

Depending on the electronic device, only one rubber layer 4 can be used.

The invention claimed is:

1. A method to manufacture an electronic device to be applied to a rubber article, wherein the device comprises an electronic element, two layers of thermoplastic material which are arranged in a sandwich like manner so as to contain said electronic element there between, and at least two outer rubber layers, each of the at least two outer rubber layers arranged to cover an outer surface of a respective thermoplastic layer, said method comprising:

a deposition operation, during which an adhesive solution comprising a basic water solution comprising a latex of an elastomer rubber and a combination of resorcinol and formaldehyde is applied on at least one outer surface of one of the layers of thermoplastic material; and a heating operation, during which the layers of thermoplastic material on which the adhesive solution was applied are kept at a temperature ranging from 120 to 230° C. for an amount of time ranging from 2 to 15 min.

2. The method of claim 1, wherein at least one of the layers of thermoplastic material is made of insulating material.

3. The method of claim 2, wherein said insulating material is chosen in a group comprising polyesters, polyamides, and polyimides.

4. The method of claim 2, wherein said insulating material is comprised in a group consisting of PET, Nylon, and polyethylene naphtalate.

5. The method of claim 1, wherein said basic water solution comprises a pre-condensed resin comprising resorcinol and formaldehyde with isocyanate blocking groups.

6. The method of claim 5, wherein said basic water solution comprises lignin and a chemical chosen between urea and thiourea.

7. The method of claim 1, wherein said elastomer rubber latex comprises a latex of styrene-butadiene-vinylpyridine or a mixture of styrene-butadiene-vinylpyridine and styrene-butadiene.

8. The method of claim 1, wherein said deposition operation involves said adhesive solution being applied on both surfaces of the layers of thermoplastic material.

9. The method of claim 1, wherein said rubber article is a tire.

10. The method of claim 1, wherein said electronic element comprises an RFID chip, a first antenna connected to the chip, and a second antenna electromagnetically coupled to the first antenna.

11. An electronic device to be used in a rubber article, wherein the device comprises:

an electronic element;

two layers of thermoplastic material which are arranged in a sandwich like manner so as to contain said electronic element there between;

at least two outer rubber layers, each of the at least two outer rubber layers arranged to cover an outer surface of a respective thermoplastic layer; and an adhesive solution comprising a basic water solution comprising a latex of an elastomer rubber and a combination of resorcinol and formaldehyde applied on at least one outer surface of one of the layers of thermoplastic material, wherein the layers of thermoplastic material on which the adhesive solution was applied are kept at a temperature ranging from 120 to 230° C. during a heating operation of manufacture of the electronic device for an amount of time ranging from 2 to 15 min.

12. The electronic device of claim 11, wherein the electronic device is a radio-frequency identification (RFID) device.

13. The electronic device of claim 12, wherein said electronic element comprises an RFID chip, a first antenna connected to the chip, and a second antenna electromagnetically coupled to the first antenna.

14. The electronic device of claim 11, wherein at least one of the layers of thermoplastic material is made of insulating material.

15. The electronic device of claim 14, wherein said insulating material is chosen in a group comprising polyesters, polyamides, and polyimides.

16. The electronic device of claim 15, wherein said insulating material is comprised in a group consisting of PET, Nylon, and polyethylene naphtalate.

17. The electronic device of claim 11, wherein said basic water solution comprises a pre-condensed resin comprising resorcinol and formaldehyde with isocyanate blocking groups.

18. The electronic device of claim 17, wherein said basic water solution comprises lignin and a chemical chosen between urea and thiourea.

19. The electronic device of claim 11, wherein said elastomer rubber latex comprises a latex of styrene-butadiene-vinylpyridine or a mixture of styrene-butadiene-vinylpyridine and styrene-butadiene.

20. The electronic device of claim 11, wherein said rubber article is a tire.

* * * * *